INVENTOR
ERNEST H. GATZERT
BY
Francis E. Blake
ATTORNEY

Aug. 18, 1959 E. H. GATZERT 2,900,450

DIAL SYSTEM

Filed May 16, 1956 5 Sheets-Sheet 2

INVENTOR
ERNEST H. GATZERT
BY
Francis E. Blake
ATTORNEY

Aug. 18, 1959 E. H. GATZERT 2,900,450

DIAL SYSTEM

Filed May 16, 1956 5 Sheets-Sheet 3

INVENTOR
ERNEST H. GATZERT
BY
Francis E. Blake
ATTORNEY

Aug. 18, 1959 E. H. GATZERT 2,900,450

DIAL SYSTEM

Filed May 16, 1956 5 Sheets-Sheet 4

INVENTOR
ERNEST H. GATZERT
BY
Francis E. Blake
ATTORNEY

DIAL SYSTEM

Filed May 16, 1956

INVENTOR
ERNEST H. GATZERT
BY
ATTORNEY 2,900,450

DIAL SYSTEM

Ernest H. Gatzert, Rochester, N.Y., assignor to General Dynamics Corporation, Rochester, N.Y., a corporation of Delaware Application May 16, 1956, Serial No. 585,202

8 Claims. (Cl. 179—16)

This invention relates to telecommunication systems and particularly to arrangements for operating dial controlled switching devices.

The object of the invention is to provide circuitry for controlling distantly located switches, particularly of the multi-service type provided in unattended offices.

The invention consists generally of a means for automatically preparing a switch for response to a connection extended from a distant point thereto in a manner different from its normal response to a local connection.

It is conventional to use the so called digit absorbing and digit adding switches in small community dial offices. By way of example, where it is wished to maintain a certain uniformity in the telephone numbering system, each office is given a two digit address and this is always dialed even when a party within a given office wants another party within this same office. In such a case the two digits for this particular office are absorbed, that is they are not actually used, except to prepare the selector circuit for subsequent operation. The first selector engaged by the calling party responds to the first digit dialed by restoring and altering its circuit in such manner that another digit must be dialed to unlock the switch, that is to render it responsive without reservation thereafter. Thus two digits are used to cause certain reactions in the switch, the first to lock it and the second to unlock it but neither resulting in the extension of a connection therethrough.

In accordance with the present invention a trunk circuit from a distant office is provided with a termination through which such a local selector may be seized and which is provided with means for unlocking such selector so that it is unnecessary for the distant calling party to dial these two digits to prepare the selector to respond to a telephone address within the local exchange.

In accordance with one embodiment of the present invention, where a connection is extended from a distant point the trunk terminates in line equipment, that is the trunk terminates in a line circuit which is enabled in the same manner in which a line circuit responds to the calling of a local subscriber, whereupon a line finder is operated and the incoming trunk is extended to a local selector. However, since the operation of the line finder takes time it is arranged that that digit dialed by the distant subscriber, after the seizure of the trunk, is absorbed; that is, it is noted but is not actually used in building up the connection. Moreover, such local first selectors are arranged to transmit dial tone upon seizure by a calling subscriber and since in this case the distant calling subscriber has already responded to an original application of dial tone it is not necessary or desirable that such tone be again transmitted to him. Therefore the trunk termination is so arranged that the first digit transmitted to the seized local first selector is absorbed and the transmission of dial tone is prevented. Accordingly the trunk termination blocks the transmission of dial tone and blocks the transmission of dial pulses until time can be gained by the absorption of a digit and then automatically unlocks the seized selector so that the further absorption of digits will not be required.

Broadly stated, the invention consists in the provision of means in a trunk termination circuit for automatically unlocking a selector which would normally require the dialing of at least one digit which would be absorbed, that is which would not result in the setting of the switch but would only result in the unlocking thereof.

In accordance with a second embodiment of the invention the trunk termination is arranged to immediately unlock the seized selector without awaiting the absorption of a digit. In both cases, selectors are used in which certain levels cannot be dialed and reached ordinarily by a single digit, and in both cases the trunk termination is provided with means to automatically prepare the seized selector for immediate and straightforward use.

A feature of the invention is the use of a selector normally controlled by a locking and an unlocking relay in combination with means included in a trunk termination circuit for reaching into said selector circuit upon seizure thereof and for operating said unlocking relay.

A feature of the invention is a selector switch having means responsive to external control for selecting any given level thereof and means responsive to internal control for automatically selecting an idle line in a said selected level, having means for normally disabling said automatic selecting means, an unlocking relay for enabling said automatic selecting means, internal means for operating said relay and means responsive to external control for operating said relay.

In accordance with this feature the selector is provided with a (DA) relay which must be operated before an automatic idle line hunting movement may take place and internal circuitry is provided for normally operating this relay in response to the various primary movements of the switch. In accordance with the present invention a circuit is now provided whereby this relay is made subject to external control so that all levels of the switch may be rendered immediately accessible. Further in accordance with this feature, access to this relay is provided over the help sleeve conductor incoming to the switch and is therefore independent of the normal control of the switch over the tip, ring and sleeve conductors thereof.

The invention, otherwise stated, consists in the use of a selector switch, all levels of which are normally inaccessible to an incoming connection, provided with means for rendering all levels thereof accessible in combination with trunks from distant points having means to mark the connection as coming from a distant point and having a lead extending into the circuitry of said selector for transmitting said marking signal to said means for rendering all levels of said switch accessible.

Other features will appear hereinafter.

The drawings consist of five sheets, having seven figures, as follows.

Figure 3:
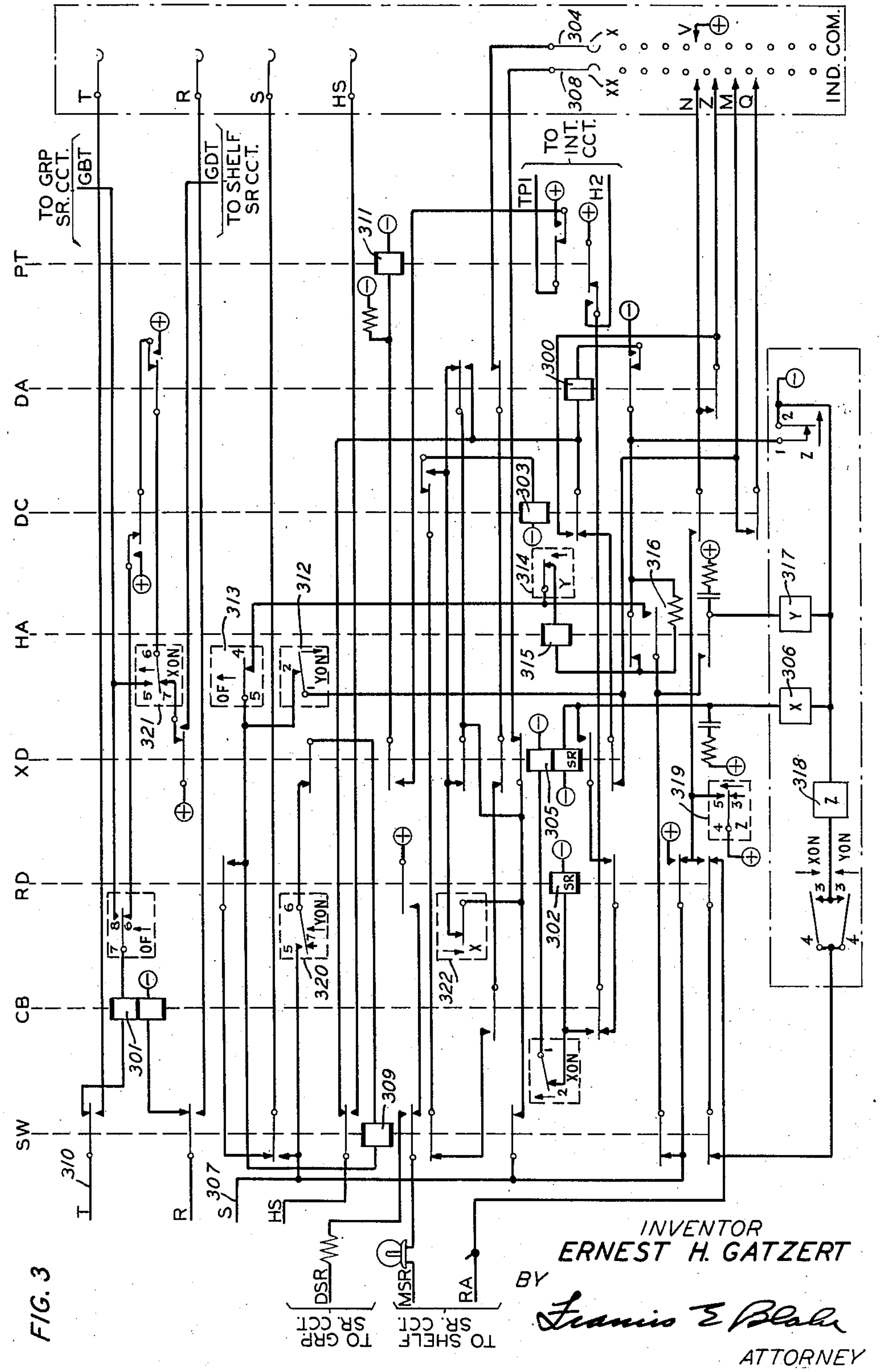
Fig. 3 is a schematic circuit diagram of a local first selector provided with digit adding and digit cancelling features and having means controlled over its HS lead from the preceding circuits for immediately unlocking the selector.
Figure 5:
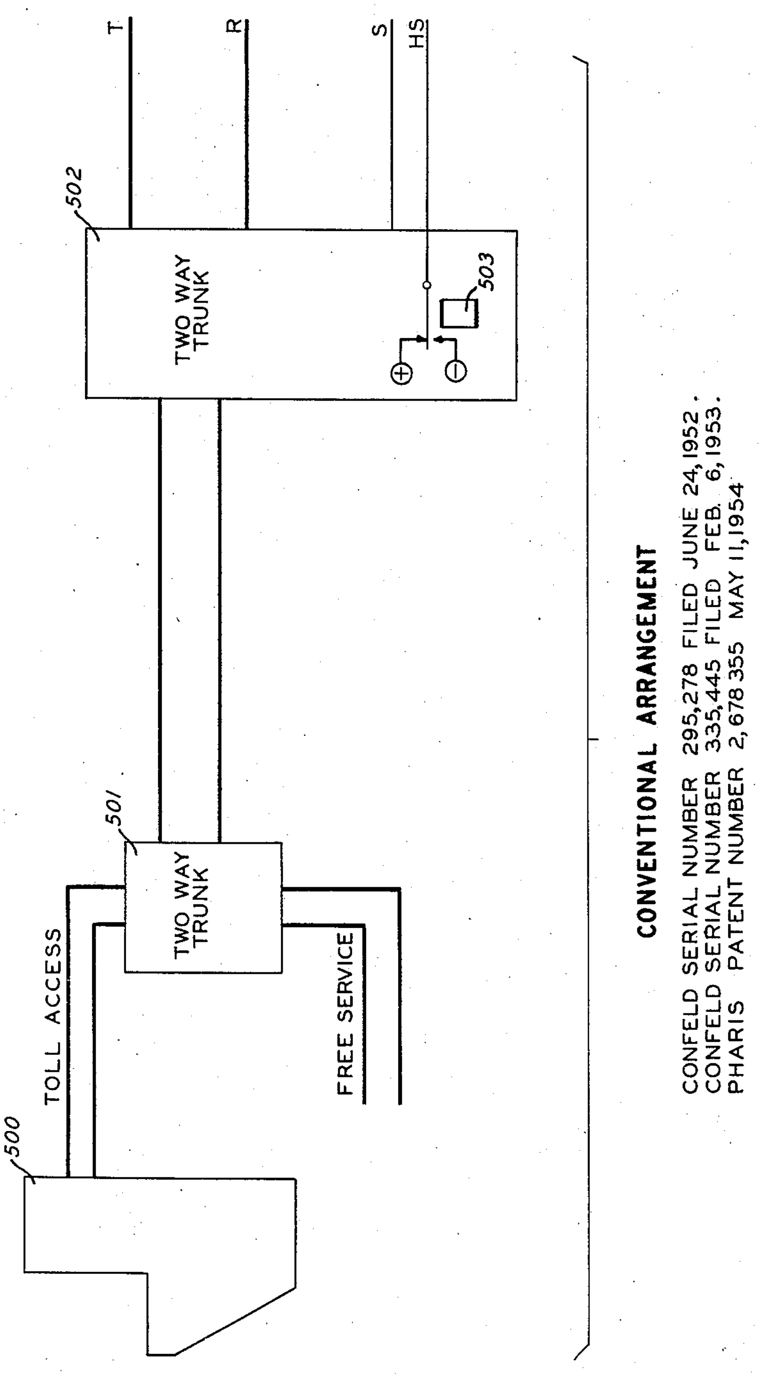
Figure 7:
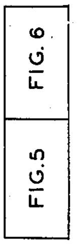
Figure 6:
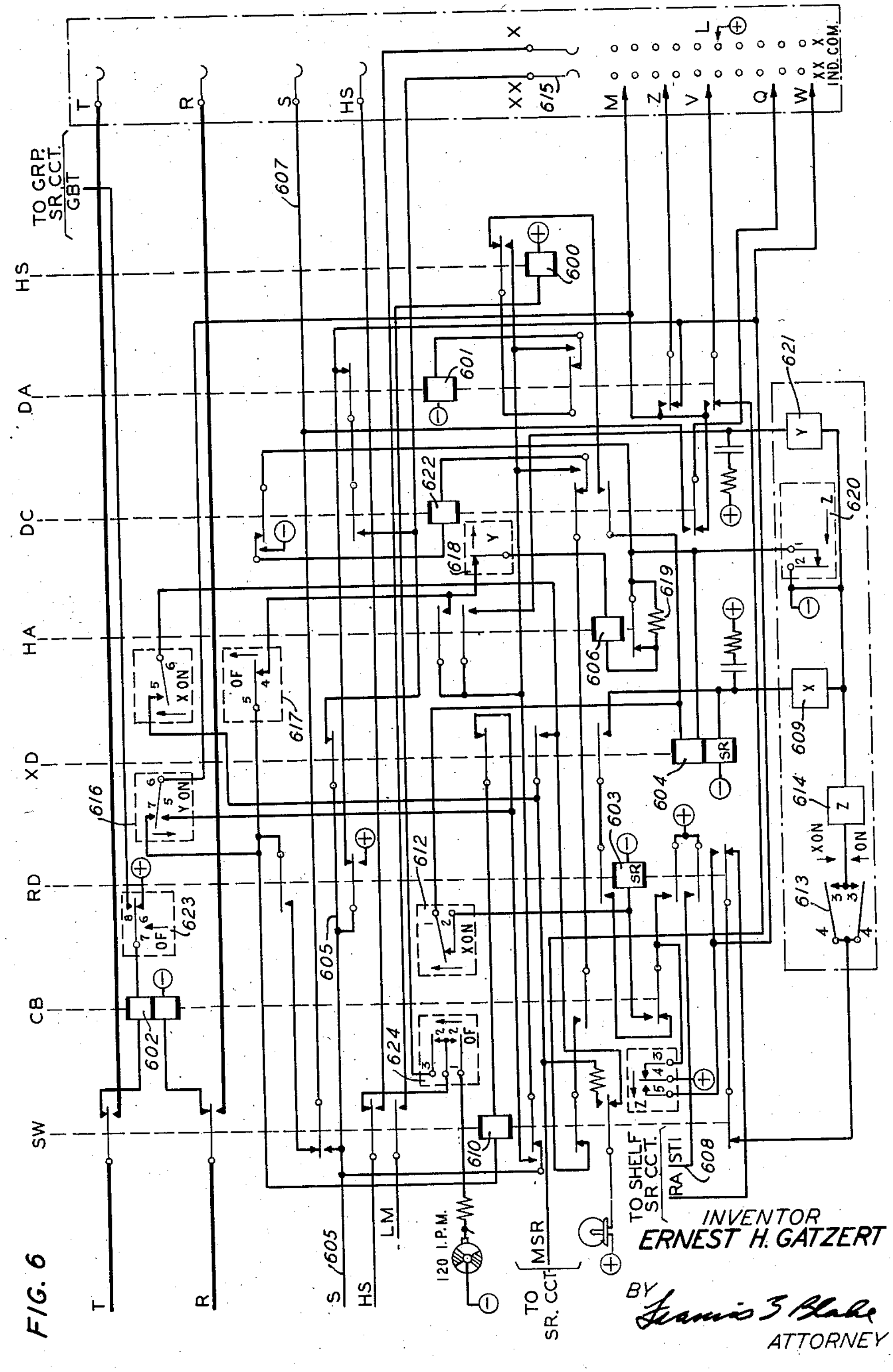

Figs. 5 and 6 when placed as indicated in the block diagram of Fig. 7 form a complete circuit diagram of another embodiment of the invention, in which Fig. 5 is a schematic circuit representation of certain conventional arrangements for generating and transmitting a toll marking pulse; and Fig. 6 is a schematic circuit diagram showing a variation of the selector circuit of Fig. 3 in which the switch acts as an incoming selector at the end of a trunk extending from a distant office wherein toll and free access connections to such trunk may be established.

The operation of the circuits is as follows. A distant CDO (Community Dial Office) subscriber 100 makes a call in the usual way and by conventional means seizes the trunk represented by the tip wire 101 and the ring wire 102 thereby placing a shunt across this circuit which results in the operation of the calling bridge relay 103. This immediately results in the operation of the RD relay 104, the SR relay 105, the SH relay 106 and the line relay 200, which enables the line circuit of Fig. 2 and causes the allotted line finder to extend the connection to a local first selector. It will be understood that in most cases such first selector will be properly brought into the connection before the distant subscriber dials the next digit. However, to provide for fast operation wherein the subscriber may start the transmission of the next digit before the line finder has completed its operation, the trunk is arranged to absorb the next digit. Consequently the pulses of this next digit will be barred from the circuit beyond the trunk circuit by a shunt placed about the pulsing contacts of the calling bridge relay.

The operation of the CB relay 103 is believed to be obvious since its two windings are connected through the coils 108 and 109 of the repeating coil to the tip and ring conductors of the trunk. The RD relay 104 responds directly to the armature and front contact of the CB relay 103. The CB relay closes a contact whereby the windings of the line relay 200 are connected through the windings 110 and 111 of the repeating coil to the upper winding of the SR relay 105. Here an unconventional connection is made, for the usual connection of the line relay is reversed so that there is battery on the tip and ground on the ring whereby the relay 105, biased by a connection completed to its lower winding by the RD relay 104, now becomes operated. This closes a circuit from ground, a back contact and armature of the SF relay 112, an armature and front contact of the SR relay 105 and thence through the winding of the SH relay 106 to battery. The SH relay whose conventional function is to operate during the dialing of a digit now operates to shunt the repeating coils 110 and 111 to prevent the transmission of dial tone from the local first selector, when it is found, to the distant CDO subscriber 100.

Upon the operation of the RD relay 104 a circuit is closed to shunt the contact closed by the CB relay 103 in the tip circuit between the coil 110 and the battery winding of the line relay 200 to prevent dial pulses reaching the local first selector until the operation of the DA relay 113 after the first digit has been absorbed.

The circuits now established will be maintained either until a local first selector is seized and the line circuit is discharged or until the distant subscriber dials.

If the local first selector is properly seized and the line circuit is discharged before the distant subscriber dials, then the polarity of the current to the SR relay 105 is reversed and this relay releases. Upon its release the SR relay 105 opens the circuit of the SH relay 106 and allows this relay to release. If the distant subscriber starts to dial before the SH relay 106 releases then this relay will remain operated until the end of the train of dial pulses. In either event after the release of the SR relay 105 there will be an interval before the release of the SH relay 106 during which a circuit will be completed from ground, an armature and back contact of the SR relay 105, a front contact and armature of the SH relay 106, the HS conductor 114, through the circuits of the line finder and thence to the winding of the DA relay 300 in the local first selector and this relay unlocks the first selector so that it will respond ordinarily to the next digit dialed thereinto regardless of the marking of the level to which it is driven. It may be noted that if this operation is completed before the distant subscriber dials the first digit after the seizure of the trunk, that during the dialing of this digit the SH relay 106 will be operated again and during this period will again close the circuit to operate the DA relay 300 but this does not entail any further operation since the DA relay locks upon its first operation and is not further affected by this second circuit closure.

Let us assume now that the distant subscriber dials the digit that will be absorbed in the trunk circuit, that is, the digit immediately following the seizure of the trunk. As the CB relay 103 follows these pulses a circuit is closed from an armature and back contact thereof, an armature and front contact of the RD relay 104, an armature and back contact of the DA relay 113, the winding of the SH1 relay 115 to battery whereby this relay becomes operated and due to its slow releasing characteristics remains operated until a short interval after the end of this train of pulses. The SH1 relay closes a circuit through the lower winding of the DA relay 113 which energizes this relay sufficiently to operate its X contact but not enough to operate any of its other contacts. During the application of ground to the junction of the two windings of the DA relay 113, the upper winding will be short circuited but upon the removal of this ground upon the release of the SH1 relay 115, the DA relay 113 will be energized through both of its windings in series, from the battery connected to its lower winding, the said two windings in series, the X contact of the DA relay 113 and thence through a front contact and armature of the RD relay 104 to ground. This will provide an increased energization of the DA relay 113 so that this relay becomes completely energized. This opens the shunt about the armature and front contact of the CB relay 103 so that dial pulses transmitted thereafter will be relayed to the seized local first selector shown in Fig. 3.

Upon the operation of the DA relay 113 a circuit is closed from ground, an armature and front contact of the CB relay 103, a front contact and armature of the DA relay 113, an armature and back contact of the SF relay 112 and thence through the lower winding thereof to battery. Since the upper winding of this relay will be shortcircuited through its X contact, the energization provided at this time is only sufficient to operate this X contact and the relay will remain in this condition until the subscriber at station 100 dials the next digit. Upon the first release of the CB relay 103 at this time, the SF relay becomes completely energized through its two windings in series, through its X contact to the ground provided by the RD relay 104. The SF relay 112 controls a circuit for operating the busy BY relay 116, but since a satisfactory operation is assumed at this time and the SR relay is not operated, the BY relay 116 is not operated. It may be noted that during the dialing of the next digit for the setting of the local first selector, the SH1 relay 115 becomes operated again and since it now locks from a ground on its own armature and front contact and an armature and front contact of the DA relay 113, it permanently opens the circuit of the BY relay 116.

Let us now assume that the subscriber at station 100 has dialed the digit to be absorbed and has at least started the dialing of the next digit for setting the local first selector even before that selector has been found. In this case the SR relay 105 will be still operated so that as the CB relay 103 releases in response to the first pulse of this next train of pulses and the SF relay becomes fully operated, the circuit for the normal operation of the SH1 relay 115 will be switched by the SR relay 105 to the winding of the BY relay 116 instead. This relay thereupon opens the tip wire to the line circuit and line finder circuit of Fig. 2, connects the group busy tone 117 through the condenser 118 to the ring wire 102 and locks through its front contact and armature to the ground supplied by the RD relay 104. This connection will be maintained until the calling subscriber hangs up.

*The local first selector*

The local first selector is a device having a circuit connected to the T, R, S and HS leads coming from the right of the line finder circuit (Fig. 2) and terminating as shown in Fig. 3 in four like named brushes for extending the connections further through selectors and connectors or through connectors alone.

The principal functions of this switch are similar to a like switch shown and described in Patent 2,723,313 granted November 8, 1955, to Fisher, with certain specific differences to be brought out hereinafter, the principal one of which is a connection from the incoming HS lead to the winding of the DA relay 300 for the purpose of unlocking the switch immediately upon seizure. These functions may be listed as follows.

(1) This switch is adapted to provide a system for universal inter-office numbering plans, with the use of all selector levels.

(2) A level is said to be a Digit Cancelling level if the switch releases and the circuit restores to the same condition it was in before the level was dialed. Such a level cannot be used until some other level has been dialed to alter the circuit conditions or such circuit conditions have been altered by the immediate operation of the DA relay.

(3) A level is said to be a Digit Adding level if the switch after being dialed to that level restores to normal, but in doing so alters the circuit in such a manner that later the same level may be dialed and the regular searching and switch through take place.

(4) Whenever the switch is stepped to a level with "M" wiring, the switch will search and switch through to the succeeding equipment on the first step found idle.

(5) When the switch is stepped to a level with "N and V" wiring before any other levels have been dialed, the switch will restore and so alter the circuit to make it available for use. Thus it was the first Digit Adding level. If the same level is dialed again without release of the circuit, or without having dialed certain other levels, the level will be a Digit Cancelling level. When dialed after the second digit adding level has been dialed, the "N and V" level will be used.

(6) If the switch is first stepped to a level with "N" wiring, Busy Tone will be returned to the calling subscriber and no further action will take place until the circuit is released. If the "N" wiring level is dialed after the first Digit Adding level has been dialed, the "N" level will act as a Digit Cancelling level. If the "N" wiring level is dialed after the second Digit Adding level has been dialed, the level will be used and the selector will switch through to the succeeding equipment on the first step found idle.

(7) If the switch is stepped to a "Q" wiring level before any other levels have been dialed, Busy Tone will be returned to the calling subscriber and no further action will take place until the circuit is released. If the "Q" wiring level is dialed after the first Digit Adding level has been dialed, the level will be used and the selector will hunt and switch through to the succeeding equipment on the first step found idle.

(8) If the switch is stepped to a "Z" wiring level before any other level has been dialed, Busy Tone will be returned to the calling subscriber as for "N" and "Q" wiring levels. If the switch is dialed to a "Z" wiring level after a first Digit Adding level has been dialed, the switch will release and so alter the circuit that any level dialed next will cause the selector to hunt and switch through. This was the second Digit Adding level.

(9) If the switch is stepped to a level with "Z and V" wiring before any other level has been dialed, the switch will restore to normal and so alter the circuit that any level dialed after this will be used. This is single Digit Adding. If the "Z and V" wiring level is dialed after the first Digit Adding level, the switch will restore and alter the circuit so that any level dialed after this will be used. This type of wiring is sometimes called the Unlocking level, as whenever this level is dialed the next level dialed will be used.

(10) If no wiring is used on the first level dialed, Busy Tone will be returned to the calling subscriber. A level with no wiring will be used after the second Digit Adding level has been dialed.

(11) The switch may be unlocked over the help sleeve conductor prior to any response to dialing in which case any level dialed will be selected, and the switch will hunt and switch through to the succeeding equipment on the first step found idle.

(12) This circuit provides permanent timing for release of the selector and associated linefinder if the line is shorted or receiver off hook. The line circuit will go into lockout.

*Detailed description*

When this circuit is seized by the preceding equipment the tip and ring loop is closed to the CB relay 301 and this relay in operating causes the immediate operation of the RD relay 302, the XD relay 305, and connects the DC relay 303 to the X wiper 304. The RD relay 302 operates and applies ground to the MSR lead, prepares part of the pulsing path to the X magnet 306, applies ground to the back S lead 307 to hold the preceding equipment and to mark this circuit busy to other calls. The XD relay 305 operates, completes the impulsing path to the back contact of the CB relay 301, opens the path to the XX wiper 308, disconnects the DC relay 303 from the X wiper lead, opens a path to the SW relay 309 and applies the GDT (grounded dial tone) through the upper winding of the CB relay 301 to the tip lead 310.

Dial pulses transmitted to the selector are followed by the CB relay 301, each momentary release of this relay corresponding to one such pulse. On the first restoration of the CB relay the ground on the armature of the PT relay 311 is extended to the X magnet 306 and the lower winding of the XD relay 305 so that as the switch goes off normal in the X movement the XD relay loses its original operating circuit through its upper winding and thereafter depends for its continued energization on the succession of pulses and its slow releasing characteristics.

On completion of the last pulse of the train the CB relay remains steadily operated whereupon the XD relay restores and the circuit for the X magnet is opened. Upon the restoration of the XD relay 305 the circuits of the X wiper 304 and the circuits of the XX wiper 308 are closed. The sleeve ground is now extended to the XX wiper. With "M" wiring the DA relay 300 will be operated, with "N and V" wiring the DC relay 303 will be operated and with "Z and V" wiring both the DA relay 300 and the DC relay 303 will be operated. Various other combinations met under different circumstances will be brought out hereinafter.

If no digit adding or digit cancelling level has been reached by this first, X or primary movement of the switch, then hunting for an idle line will take place.

If the dialed level is a level with "M" wiring, the sleeve ground on the XX wiper is extended through the YON contacts 312, the OF contacts 313, the Y magnet interrupter contacts 314 to the winding of the comparatively low resistance HA relay 315 to battery controlled by the Z magnet interrupter contacts. The HA relay operates, inserting a resistor 316 in its circuit and closes a circuit for the Y magnet 317. The HA relay and the Y magnet are mutually controlling so that when the Y magnet becomes fully operated it opens the circuit of the HA relay and when this relay then releases, it opens the circuit of the Y magnet, after which the circuit of the HA relay is again closed so long as a busy ground is found by the sleeve brush of the selector. When this is lost upon the finding of an idle line then the HA relay fails to operate again. Thereupon a circuit is completed from the sleeve 307 ground, the YON contacts 320 now closed, the winding of the SW relay 309 through the OF contacts 313 and thence through the winding of the HA relay to battery. The SW relay is comparatively high resistance so that it operates in series with the HA relay but this latter relay cannot respond to the limited current now flowing through its winding. The SW relay is the switch through relay and it operates to extend the connection through to the next circuit. Upon its operation the CB relay 301 and the RD relay 302 become released and the switch is maintained with only the SW relay 309 operated under control of a ground now returned over the sleeve wire from the succeeding circuits.

The hunting operation, after Digit Adding levels have been dialed, is the same as above described except that when hunting starts the DA relay 300 is operated and if any level but an "M" wiring level is dialed, the path to first operate the HA relay is from battery at the Z magnet interrupter contacts, the winding of the HA relay 315, the Y interrupter springs 314, OF contacts 313, YON contacts 312, back contact and armature of the XD relay 305, back contact and armature of the DC relay 303, front contact and armature of the DA relay 300, back contact and armature of the SW relay 309, and armature and front contact of the RD relay 302 to ground.

If all succeeding equipment is busy the switch steps to its 11th position and operates the OF (overflow) contacts whereupon Busy Tone is applied to the upper winding of the CB relay 301 for transmission to the calling subscriber.

If idle succeeding equipment is found indicated by absence of ground on the sleeve brush, then the HA relay does not reoperate and the shunt is removed from about the winding of the SW relay 309 and this relay operates in series with the HA relay 315 as hereinbefore described.

Figure 2:
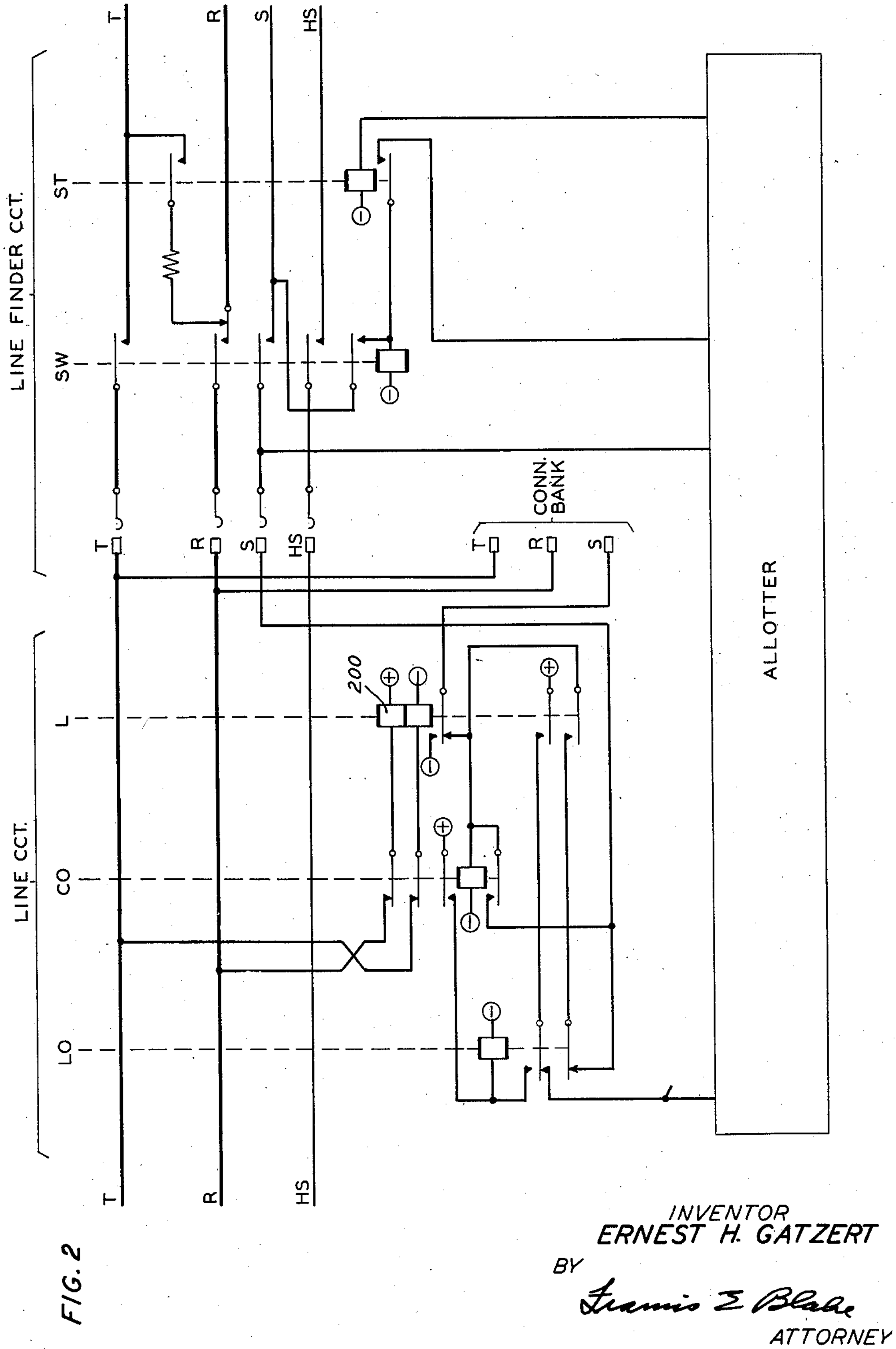
Fig. 2 is a schematic circuit diagram showing only certain elements of a conventional line circuit and line finder circuit but having an unconventional reversal of the leads to the line relay whereby a trunk termination circuit may be signalled that a connection has been extended through these circuits into a local first selector and that such selector is ready for use.

When, at the end of a conversation, the succeeding equipment removes ground from the sleeve lead the SW relay 309 restores and opens the leads to the line finder circuit of Fig. 2. Low resistance ground on the RA lead from the shelf supervisory circuit is now extended through a back contact and armature of the RD relay 302, through the XON and YON contacts to the Z release magnet 318 to battery whereby this selector is returned to its released condition. The Z magnet contacts 319 grounds the S lead 307 to guard the circuit during release.

When the switch has gone to overflow, busy tone is transmitted to the calling line. When the calling subscriber responds and releases then the CB relay 301 releases and in a short interval the RD relay restores. This opens the circuit to the DA relay 300 and the DC relay 303 so that either or both of these relays, if operated, will release. The Z magnet is energized and the switch is restored to normal.

*The wiring options*

When the switch has been stepped in the X direction to a level corresponding to the dial pulses, the XD relay 305 releases at the end of the train of pulses whereupon ground will be extended to the XX wiper over the operated contacts of the RD relay 302, the normal contacts of the SW relay 309 and the normal contacts of the XD relay 305. Various reactions of the switch will take place in accordance with the N, Z, M, Q and V wiring, as follows.

If the switch is stepped to a level with "N and V" wiring before any other levels have been dialed, the "V" wiring ground will complete a circuit over the X wiper too perate the DC relay 303 which thereupon locks to the sleeve ground and remains operated thereafter until the switch is released. The DC relay in operating applies ground to the upper winding of the CB relay, cutting off the path from the dial tone circuit. The DC relay extends the ground from the XX wiper by way of the "N" wiring through the front contact and armature of the RD relay 302 to the Z release magnet 318 which thereupon releases the switch to normal except that the DC relay remains operated. The CB relay 301, the RD relay 302 and the XD relay 305 as well as the D.C. relay 303 are now operated. The XD relay cuts off the circuits to the X and XX wipers. Dial tone is removed through the operation of the DC relay.

If this "N and V" level is again dialed, the ground placed on the XX wiper when the XD relay releases will again cause the Z release magnet to operate. Thus it will be impossible for the calling subscriber to reach an "N and V" level after first dialing such a level.

If an "N" wiring level is dialed before any other levels have been dialed, the ground placed on the XX wiper when the XD relay releases will not complete a path to any relay. Busy Tone, through the XON contacts 321, will be applied to the calling line and no further action can take place until disconnect.

If an "N" wiring level is dialed after some level had been dialed which caused the DC relay to become operated, then the result will be the same as for dialing an "N and V" level a second time.

If a "Q" wiring level is dialed before any other levels have been dialed, the ground placed on the XX wiper when the XD relay releases will not complete a path to any relay. Operation will continue as above described for dialing an "N" level for the first time.

If a "Q" wiring level is dialed after some level had been dialed which caused the DC relay to be operated, the "Q" and "M" leads will be connected together and the operation will proceed as above described for the "M" wiring, that is the HA relay 315 will be operated and the switch will proceed to hunt.

If a "Z" wiring level is dialed before any other level has been dialed, the action will be the same as for dialing an "N" or "Q" level for the first time, that is Busy Tone will be applied to the calling line.

If a "Z" wiring level is dialed after some level had been dialed which caused the DC relay to be operated, the ground placed on the XX wiper when the XD relay releases will close a circuit to the DA relay 300.

The DA relay operates and locks to the sleeve ground and puts the DC relay under control of the X interrupter 322 so that upon the first following step in the X direction the DC relay will release. The DA relay also extends the ground on the "Z" lead to the Z release magnet 318 to return the switch to normal. When the XON contacts are restored to normal the Z release magnet releases and the XD relay 305 reoperates. The switch circuit is now unlocked, that is it is changed in such a manner that no matter what level is dialed next the switch will hunt. On the first reoperation of the X magnet 306 when the next digit is dialed, the X interrupter contacts 322 will open and release the DC relay and the release of this relay prepares a path to operate the HA relay after the release of the XD relay.

If a level with the "Z and V" wiring is dialed before any other level has been dialed, the ground from the "V" wiring will close the circuit to the DC relay when the XD relay releases at the end of the train of dial pulses. The D.C. relay operates and locks and closes the circuit from the ground on the XX wiper to the DA pulses. The DC relay operates and locks and closes a circuit to the Z release magnet which in operating releases the switch. The selector will now hunt no matter what level is dialed next.

If a level with no wiring is dialed before any other level has been dialed, Busy Tone will be returned to the calling subscriber as for the "N," "Q" and "Z" wiring.

If a level with no wiring is dialed after the DC and DA relays are operated, hunting will start.

Figures 1, 4:
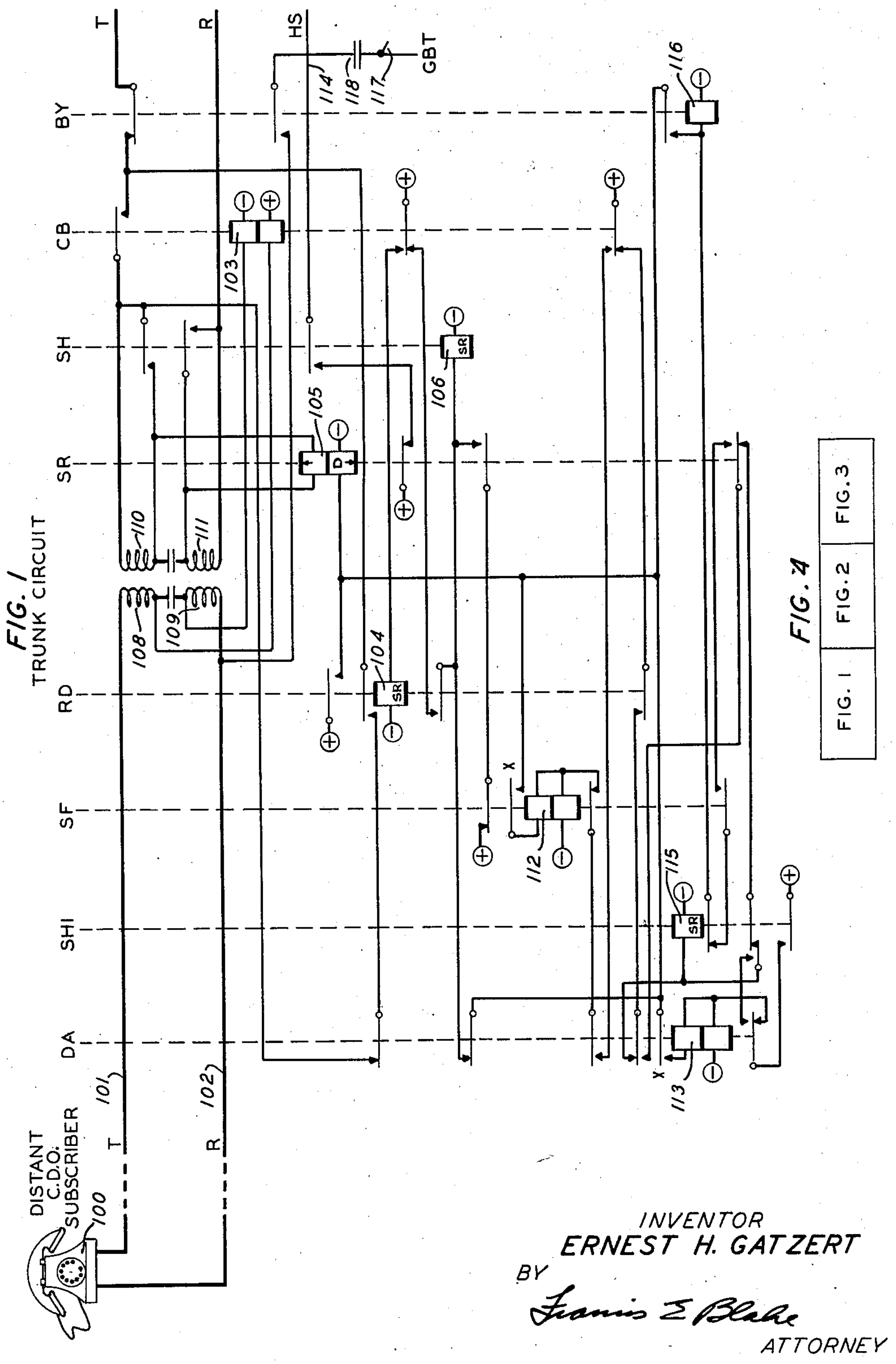
Fig. 1 is a schematic circuit diagram showing a connection made by a distant CDO subscriber over a trunk having a digit absorbing circuit to provide time for the operation of the line circuit and line finder circuit used for associating a first selector with such trunk and having means for marking the established connection for immediate response to any digits dialed thereinto.
Fig. 4 is a block diagram on the same sheet as Fig. 1 showing how Figs. 1, 2 and 3 may be placed to provide a complete circuit diagram of one embodiment of the invention.

If this selector is seized by a trunk circuit having means to identify itself, as the circuit of Fig. 1, then the DA relay 300 will be immediately operated, putting the selector into condition to reach any level and to begin hunting.

*Permanent timing*

When this selector is first seized and the XD relay 305 is operated, a TP1 pulse may operate the PT relay 311. The operation of the PT relay changes the holding circuit for the RD relay 302 from a steady ground to a ground under control of a machine interrupter which will release this relay within two minutes and thus release the switch. If before the expiration of this time interval the switch responds to a train of dial pulses, then the PT relay will be released. When the release of the RD relay is thus forced, the ground will be removed from the sleeve lead 307 and the line circuit will go into lockout.

*The incoming selector*

A second embodiment of the present invention consists of an incoming selector modified to respond to conventional toll marking to unlock the selector so that all levels thereof will be immediately accessible. It may be said in general that there are two variations of toll marking arrangements, one in which a distant incoming switch is controlled upon seizure and another in which such switch is controlled thereafter. A Patent 2,621,258 to Balzer and an application of Confeld, Serial Number 295,278, filed June 24, 1952, both show a variety of toll marking in which a seized incoming selector is immediately signalled the character of the distant connection from which the call was made. Using this sort of conventional arrangement it will be understood that as the incoming selector of Fig. 6 is seized, the HS conductor incoming thereto will have the normal ground connection changed, at least momentarily, to battery, whereby the HS relay 600 will be operated for a sufficient length of time to cause the operation and locking of the DA relay 601 so that upon the dialing of the first train of pulses into this selector it will be enabled to gain access to any level thereof. This, as will be described more in detail hereinafter, is the equivalent of finding each and every level arranged with "M" wiring.

A Patent 2,678,355 issued May 11, 1954, to Pharis, and an application of Confeld, Serial Number 335,445, filed February 6, 1953, both show arrangements by which the incoming selector is signalled during dialing by a toll marking circuit so that the HS conductor incoming thereto is changed in the trunk termination from a normal ground to a battery connection. In this type of toll marking the HS relay 600 within the incoming selector will be operated during the dialing of the first digit after seizure and will therefore change all levels of such incoming switch to the equivalent of "M" wiring.

In the drawings, Fig. 5 is a skeleton schematic circuit diagram showing a toll board 500 having a toll access channel to a two way trunk terminal 501, which may also be approached over a free service channel, and leading to a distinct two way trunk termination 502. Within this latter circuit component there is indicated a relay 503 which will change the normal ground connection on the HS conductor to the incoming selector to a battery connection for the purpose of operating the HS relay 600 therein. The operation of this relay is conventional in various arrangements hereinabove pointed out so that only a generalized indication is provided here.

The incoming selector of Fig. 6 is largely conventional with the exception of the presently provided HS connection to the HS relay 600 for the purpose of unlocking this selector when it is seized by this trunk connection incoming from a distant toll board. It will be understood that when the incoming selector comes into use for a connection from the toll board 500 wherein the relay 503 is operated either upon the seizure of the selector or at least upon the dialing of the first digit thereafter by the toll operator, all levels of the selector will be rendered accessible, but that when the selector comes into use for a connection from a free access line wherein the relay 503 is not operated, only those levels of the selector provided with wiring to operate the DA relay 601 such as the levels provided with "M" wiring will be immediately accessible.

The principal functions of the incoming selector of Fig. 6 may be briefly stated as follows.

(1) Whenever the DA relay is operated before any level has been reached by dialing or is operated by being stepped to a level with "M" wiring, the switch will search and switch through to the succeeding equipment on the first step found idle. The "M" wiring provides access to a particular level whereas the general operation of the DA relay provides access to all levels regardless of their particular wiring (except for the "W" wiring).

(2) Whenever the switch is stepped to a level with "W" wiring, the switch will not search, but will be returned to normal and the circuit will restore to its seized condition (Preliminary Pulse Absorption).

(3) Before a "V" level has been dialed, whenever the switch is stepped to a level with "Z" wiring, the switch will not search but will be stepped to the overflow position returning busy tone to the calling line. The second time the switch is stepped to a level with "Z" wiring, after a "V" level has been dialed, the switch will search and switch through to the succeeding equipment on the first step found idle (Digit Adding).

(4) The first time the switch is stepped to a level with "Q" wiring, before a "V" level has been dialed, the switch will search and switch through to the succeeding equipment on the first step found idle, the same as for "M" wiring. After a "V" level has been dialed and the switch is stepped, the first or second time to a level with "Q" wiring, the switch will not search but will be stepped to the overflow position returning busy tone to the calling line.

(5) The first time the switch is stepped to a level with "V" wiring the switch will not search but will be returned to normal. The second time the switch is stepped to a level with "V" wiring, the switch will search and switch through to the succeeding equipment on the first step found idle (Digit Adding).

(6) When the switch is stepped into overflow position, busy tone is applied to the calling line and 120 I.P.M. battery returns flash busy indication on the HS lead.

(7) During release of the switch, ground on the back sleeve lead guards this selector from seizure.

(8) The circuit will be released when the calling party disconnects after the application of busy tone.

When this circuit is seized from the preceding equipment, the tip and ring loop is closed to the CB relay 602. This calling bridge relay operates, closing a circuit to the RD relay 603 and the upper winding of the XD relay 604 in parallel. The RD relay 603 operates, grounds the back sleeve conductor 605, connects the HA relay 606 to the sleeve lead 607 and grounds the ST1 start lead 608. The XD relay 604 operates, completes the impulsing path from the armature of the RD relay 603 to the X magnet 609 and its lower winding in parallel and opens the circuit of the SW relay 610. The switch remains in this condition until dial pulses are received.

When the calling subscriber, which may be an operator at the toll board 500, dials into the incoming selector, the calling bridge relay 602 will release momentarily for each "pulse" of the train of dial pulses.

On the first restoration of the CB relay 602, the circuit of the relay 603 and the circuit of the upper winding of the XD relay 604 are opened but these relays both being slow to release will not restore over the interval of a dial pulse. The restoration of the CB relay 602 also establishes a circuit over a front contact of the RD relay 603, a circuit for the lower winding of the RD relay 603 and in parallel therewith a circuit for the X magnet 609. The X magnet operates, stepping the switch one step in the X direction and operating the X off normal springs. The XON springs 612 open the upper winding of the XD relay 604 so that this relay now has to depend for its continued energization on a back contact of the CB relay 602 during the continuance of this series of dial pulses so that a short interval after the end of ths train the XD relay will restore. Operation of the XON springs 613 closes a path from the "W" wiring to the Z magnet 614 so that the switch will be released if a "W" level has been reached after the XD relay 604 restores.

If the switch has been stepped to a level marked by "M" wiring, or if the DA relay has in the meantime become operated so that the "Z," "Y" or "Q" wires are at this time effectively connected to the "M" wire, then a ground on the back sleeve wire 605 will be extended through the XX wiper 615 to the "M" wire thence through the YON contacts 616 (not as yet operated), the overflow contacts 617, the Y magnet interrupter contacts 618, the comparatively low resistance winding of the HA relay 606, the Z magnet interrupter contacts 620 to battery. The HA relay 606 operates and opens its starting circuit but remains operated in series with the resistance 619. It closes a locking circuit to the ground on the back sleeve 602 through the Y magnet interrupter springs 618 and extends the back sleeve ground to the Y magnet 621. The Y magnet operates, moving the switch one step in the Y direction and operating its interrupter springs to open the circuit of the HA relay 606. Thus it will be seen that the HA relay and the Y magnet are mutually controlling so that when the HA relay operates it causes the operation of the Y magnet whereupon the circuit of the HA relay is opened and so on. As the switch moves off normal in the Y direction, the Y off normal springs operate and the SW relay 610 is placed in a circuit where a ground on the sleeve 607 found by the sleeve brush on a busy line short circuits the SW relay, but as soon as an idle line is found and no ground is connected to the S lead 607, the comparatively high resistance SW relay will operate in series with the HA relay which cannot now respond. Therefor as long as busy lines are encountered the HA relay will reoperate after the Y magnet has restored and the switch will be stepped on in the Y direction. When an idle line is found the SW relay 610 will operate to cut through and the HA relay will fail to respond. After the switch has cut through the T, R, S and HS incoming conductors will be extended to the T, R, S and HS brushes, a ground will be returned from the succeeding equipment over the S wire 607, the SW relay will remain operated in series with the HA relay (not operated) and all other relays will release.

The operations on an all trunks busy operation, and the release of the switch from its 11th position or from an operated position will not be described as they are conventional.

*The wiring options*

The "W" wiring is usually used on level 1 for preliminary pulse absorption. The ground on the XX wiper 615 upon the release of the XD relay is extended to the Z release magnet 614 which thereupon operates and restores the switch to normal seized condition from which it may be reoperated to any other level.

If a level with "Q" wiring is reached before the DC relay 622 has been operated, then the operation will be the same as when "M" wiring is encountered, that is the automatic trunk hunting operation and cut through will take place in normal manner.

If a level with "V" wiring is first encountered, then a circuit will be established from the ground on the XX wiper to the DC relay 622 which operates, locks, and extends the sleeve ground to the Z release magnet. The Z magnet releases the switch leaving the DC relay locked and setting up the seized condition therein. The DA relay now operates as the XON springs 612 return to normal and the XD relay also becomes operated awaiting the dialing of the next digit.

When, after the DC relay 622 has been operated and locked, the selector is then dialed to a "Q" wiring level, the ground on the XX wiper is extended through back contacts of the SW relay 610, a front contact and armature of the RD relay 603, the OF contacts 617, the Y interrupter contacts 618 and the HA relay 606 to start the automatic trunk hunting operation, with the exception now that the ground on the XX wiper 615 is connected through the "Q" wiring and the front contact of the DC relay 622 to the sleeve wire 607 so that the switch will move to the overflow position. In this position busy tone will be transmitted through the overflow contacts 623 to the calling line and the 120 I.P.M. interrupter will be connected through overflow contacts 624 to the HS conductor for transmitting a busy flash signal to the toll operator.

If the "Z" or "V" level is dialed again after a "V" level has been dialed, regular hunting will take place as described hereinbefore as the "Z" and "V" leads will now be connected to the "M" lead by the operated armatures and contacts of the DA relay 601.

When a "Z" wiring level is dialed before a "V" level, the ground on the XX wiper 615 is extended by the back contacts of the DA relay 601 to the "W" wiring whereby the switch is released through the action of the Z release magnet 614.

What is claimed is:

1. In a telecommunication system, a selector switch having digit adding and digit cancelling means variously associated with different levels thereof, said means including an unlocking relay for rendering any level of said switch freely accessible, a trunk line from a distant point, means for extending said trunk line to said selector and means in said trunk line for automatically operating said unlocking relay.

2. In a telecommunication system, a selector switch having means for normally barring access to any level thereof, an unlocking relay for rendering any level of said switch freely accessible, a trunk line from a distant point having means for seizing said selector and means in said trunk line for automatically operating said unlocking relay.

3. In a telecommunication system, a selector switch having means for rendering all levels thereof inaccessible, an unlocking relay for controlling said means to render all levels of said switch accessible, means for operating said relay responsive to the setting of said switch on particular levels thereof and means for operating said relay over an external connection established to said switch.

4. In a telecommunication system, a selector switch having a control circuit responsive to a train of dial pulses transmitted thereto from an external circuit for driving said switch to a desired level and responsive thereafter to internal circuitry for driving said switch over said selected level in an automatic idle line seeking movement, means for normally barring said automatic operation, an unlocking relay for disabling said barring means, internal circuit means for operating said relay and external means for operating said relay.

5. In a telecommunication system, a selector switch having means for normally barring access to any level thereof, an unlocking relay for disabling said barring means, tip, ring, sleeve and help sleeve connections incoming to said switch and means for operating said unlocking relay over said help sleeve connection.

6. In a telecommunication system, means to establish a connection from a distant calling subscriber to a called subscriber including a trunk distantly accessible to said calling subscriber having a local termination including a line circuit and means controlled thereby to extend the connection through a line finder to a selector, said line circuit having means to return battery of one polarity to said local termination and said selector having means to return battery of a reversed polarity to said local termination to signal said local termination that said line circuit has completed its function and that said selector is in condition to function, said local termination including a digit absorbing circuit, means controlled by said digit absorbing circuit for extending a controlling circuit from said calling subscriber through said trunk to said selector, said selector having means for rendering all levels thereof normally inaccessible to said calling subscriber, an unlocking relay for controlling said means to render all levels of said switch accessible, a polarized relay in said local termination responsive to said change of polarity and means responsive to said polarized relay for controlling said unlocking relay for giving said calling subscriber immediate access to any level of said selector.

7. In a telecommunication system, means to establish a connection from a particular class of calling subscribers to a called subscriber including a trunk distantly accessible to calling subscribers and having a local termination including marking means responsive to a connection established from one of said particular class of calling subscribers, said local termination being connected to an incoming selector, said selector having means for rendering all levels thereof normally inaccessible to said calling subscriber, an unlocking relay for controlling said means to render all levels of said switch accessible to a calling subscriber and means controlled by said marking means in said local termination for operating said unlocking relay.

8. In a telecommunication system, means for establishing a toll connection from a distant point over a trunk having a local termination and an incoming selector, said trunk having means to mark said connection as a toll connection in said local termination by a momentary battery reversal, said selector having means to render all levels thereof inaccessible to an incoming connection, an unlocking relay in said selector for disabling said last means to render all levels thereof accessible to incoming connections, means for extending said toll marking momentary battery reversal to said unlocking relay for operating said relay and a locking circuit for said relay for holding said unlocking relay in operated condition.

References Cited in the file of this patent

UNITED STATES PATENTS

| | | |
|---|---|---|
| 2,596,833 | Balzer | May 13, 1952 |
| 2,658,949 | Pharis | Nov. 10, 1953 |
| 2,744,963 | Pharis | May 8, 1956 |
| 2,792,451 | Pharis | May 14, 1957 |
| 2,797,262 | Horwitz | June 25, 1957 |

UNITED STATES PATENT OFFICE

CERTIFICATE OF CORRECTION

Patent No. 2,900,450 August 18, 1959

Ernest H. Gatzert

It is hereby certified that error appears in the printed specification of the above numbered patent requiring correction and that the said Letters Patent should read as corrected below.

Column 8, line 8, for "too perate" read -- to operate --; column 9, line 2, for "pulses" read -- relay 300 --; same line, for "DC relay" read -- DA relay --; line 70, for "distinct" read -- distant --; column 11, line 18, for "ths" read -- this --.

Signed and sealed this 1st day of March 1960.

(SEAL)
Attest:

KARL H. AXLINE
Attesting Officer

ROBERT C. WATSON
Commissioner of Patents